(12) United States Patent
Bangalore

(10) Patent No.: US 7,966,153 B2
(45) Date of Patent: Jun. 21, 2011

(54) INTELLIGENT IRRIGATION RAIN SENSOR

(75) Inventor: Venkataramu L. Bangalore, Plano, TX (US)

(73) Assignee: Telsco Industries, Inc., Garland, TX (US)

( * ) Notice: Subject to any disclaimer, the term of this patent is extended or adjusted under 35 U.S.C. 154(b) by 417 days.

(21) Appl. No.: 12/150,172

(22) Filed: Apr. 24, 2008

(65) Prior Publication Data

US 2009/0271044 A1    Oct. 29, 2009

(51) Int. Cl.
G06F 11/30    (2006.01)

(52) U.S. Cl. ....................................................... 702/188

(58) Field of Classification Search .................. 702/3, 31, 702/45, 46, 55, 57, 62, 104, 177, 188; 73/170.21
See application file for complete search history.

(56) References Cited

U.S. PATENT DOCUMENTS

| | | | |
|---|---|---|---|
| 4,393,890 A | | 7/1983 | Skappel |
| 4,520,667 A | * | 6/1985 | Nelson ........................ 73/170.21 |
| 4,613,764 A | | 9/1986 | Lobato |
| 4,919,165 A | | 4/1990 | Lloyd |
| 5,241,978 A | | 9/1993 | Shaw et al. |
| 5,444,611 A | | 8/1995 | Woytowitz et al. |
| 5,836,339 A | * | 11/1998 | Klever et al. ................. 137/78.2 |
| 5,839,660 A | | 11/1998 | Morgenstern et al. |
| 5,982,289 A | | 11/1999 | Kingsley et al. |
| 6,076,740 A | | 6/2000 | Townsend |
| 6,452,499 B1 | | 9/2002 | Runge et al. |
| 7,010,394 B1 | | 3/2006 | Runge et al. |
| 7,058,479 B2 | | 6/2006 | Miller |
| 2004/0140903 A1 | * | 7/2004 | Buhler .......................... 340/602 |
| 2004/0181315 A1 | | 9/2004 | Cardinal et al. |
| 2005/0216128 A1 | | 9/2005 | Clark et al. |
| 2006/0144957 A1 | | 7/2006 | Jacobsen et al. |
| 2008/0027586 A1 | | 1/2008 | Hern et al. |
| 2008/0034859 A1 | * | 2/2008 | Runge et al. ................ 73/170.21 |

* cited by examiner

Primary Examiner — Mohamed Charioui
(74) Attorney, Agent, or Firm — Rudolph J. Buchel, Jr.

(57) ABSTRACT

An intelligent irrigation rain sensor for use in an irrigation system comprises a rain sensor unit and a sensor control unit. The rain sensor unit has a rain catcher reservoir with an open top for receiving rainwater with an internal volume for holding water and tapers into a funnel. At least one droplet detector is positioned directly below the funnel opening that contacts the water droplets from the funnel. The droplet detector includes detection electrodes for sensing a change in an electrical property being monitored by a detection control in the sensor control unit and for discriminating phantom droplets from rain. Upon exceeding a rain threshold amount over measurement time period, the intelligent irrigation rain sensor issues a rain signal to the irrigation controller. The intelligent irrigation rain sensor issues a corresponding dry signal to the irrigation controller after a drying period has elapsed.

15 Claims, 6 Drawing Sheets

PRIOR ART

INTELLIGENT IRRIGATION RAIN SENSOR

BACKGROUND OF THE INVENTION

The present invention relates generally to irrigation systems. More particularly, the present invention relates to an intelligent irrigation rain sensor for use with an advanced irrigation controller and water management system.

Water is a precious resource in our environment. Growing populations, urban and suburban sprawl and ongoing droughts are impacting our water resources, resulting in natural habitat degradation and impacting the amount of water that is available for everyday use. Communities all over the United States have been faced with increased demands on existing water supplies. Recently, with the increasing need for conserving water and mandated water use restriction, there is a greater focus on water conservation, but not just in times of drought. One area that is heavily regulated is in the area of irrigation, especially lawn and landscape. The amount of water relegated to lawn and landscape irrigation, as well as the duration and times that watering is permissible, are being tightly scrutinized by local communities.

Irrigation controllers are well known and have been long used to compensate for rainfall deficits by scheduling and controlling an amount of water allocated to irrigation. Most common types of irrigation controllers incorporate a programmable clock for scheduling the day and time for initiating an irrigation cycle and a timer for programming the duration of a scheduled irrigation cycle. Typically, the clock and timer will allow the operator to separately program irrigation zones under the control of the irrigation controller. The operator sets an irrigation schedule based on, for instance, authorized watering days for the community or neighborhood, and then allocates a watering duration for each irrigation zone. The controller remains in essentially an idle state until the appointed irrigation day and time, wherein the controller commences the irrigation watering routine. These types of controllers are inherently inefficient because the irrigation cycle will commence on the appointed day regardless of the water needs of the landscape. Since the irrigation cycles are programmed in advance, the operator cannot know for sure that the landscape will require irrigating on a day scheduled for irrigation, for instance, it may have recently rained.

Recently, many municipalities have recognized the inefficiencies in preprogramming irrigation cycles and have promulgated codes requiring the use of rain sensors to postpone or cancel irrigation cycles that are scheduled immediately subsequent to or during rainfall. The need to suspend a watering cycle due to the occurrence of an environmental influence is crucial in order to save natural resources, money, and to prevent unsafe conditions. While this measure is a step in the right direction, conventional rain sensors do little more than detect moisture and suspend the pending irrigation cycles until the rain sensor no longer detects moisture.

Prior art rain sensors rely on a hygroscopic material that expands upon contact with moisture from water vapor, rain, snow, or ice. The hygroscopic material is physically connected to a switch that activates when the hygroscopic material expands, sending a signal to the irrigation controller to suspend the irrigation cycle. Once the moisture in the hygroscopic material evaporates, it shrinks and the switch is deactivated, which sends a signal to the irrigation controller to enable the irrigation cycle. The amount of water that the hygroscopic material will absorb is limited by the physical configuration of the material. Sensors that employ smaller quantities of hygroscopic material tend to react quicker to rain, sensing rain immediately and sending a signal to the irrigation controller. The amount of rainfall cannot be accurately determined from this type of sensor. Using more hygroscopic material may give a better rainfall guesstiment, but the accuracy of the sensor is still limited by the amount of water that the material can hold. Moreover, responsiveness is often sacrificed for accuracy, that is while a rain sensor that utilizes a greater quantity of hygroscopic material may be marginally more accurate, it may be less responsive, leading to the lawn sprinklers activating in a rainstorm. Because delays in the irrigation cycle are totally dependent on the rate of evaporation of the water in the hygroscopic material, some irrigation controllers employ watering delay algorithms that further retard the watering cycle, sometimes based on the elapsed time between the deactivate and activate signals from the rain sensor. However, since the estimate is totally reliant on the hygroscopic material of the rain sensor, any estimate of rainfall incorporates some amount of guesswork.

BRIEF SUMMARY OF THE INVENTION

The present invention is directed to an intelligent irrigation rain sensor that generally comprises a rain sensor unit for capturing and detecting rainfall, and a sensor control unit for monitoring the rain sensor unit, and measuring rainfall and issues rain signals and rainfall amounts. The present intelligent irrigation rain sensor may be used in conventional irrigation controllers and more advanced evapotranspiration irrigation controllers. The present intelligent irrigation rain sensor may operate as a wired or wireless sensor in either RAIN/DRY mode or ET mode. The rain sensor generally comprises a rain catcher reservoir which terminates in a metering funnel that is positioned directly above a droplet detector, which comprises at least one detection electrode pair for detecting water droplets. The rain sensor may employ any number of electrode pairs to ensure that each water droplet makes contact with at least one pair of detection electrodes. Rain is received through an upper opening of the rain catcher reservoir and temporarily held in the rain catcher/reservoir. Captured rain water egresses the rain catcher reservoir via the metering funnel at a constant drip flow (steady-state drip rate) of equal-sized water droplets. The water droplets from the metering funnel contact the detection electrodes of the droplet detector positioned beneath the funnel. Although the droplet detector may have multiple pairs for detection electrodes, a water droplet need contact only two electrodes for detection circuitry in the sensor control unit to sense the water droplet. The detection circuitry senses a state change in the detection electrodes caused by the water droplet touching a pair of detection electrodes. The state change may be related to the state of an electrical property such as resistive, inductive or capacitive properties, a mechanical property such as the position or weight or an optical property.

As opposed to prior art rain sensors, the present intelligent irrigation rain sensor accurately measures droplet counts in real-time, throughout a rainstorm, regardless of how severe the storm. Because the water droplets exit the funnel at a continuous steady-state drip rate, the amount of water from the rain catcher reservoir can be accurately interpreted from the droplet count and converted into a rainfall amount. The volume of the rain catcher reservoir is large enough to accommodate a heavy and persistent rain, so that an accurate rainfall amount can be measured even in a torrential rain event. The counter circuitry continually measures droplet counts until the rain catcher reservoir runs dry.

In accordance with one exemplary embodiment of the present invention, simultaneous detections of a single water droplet by multiple electrode pairs of the droplet detector are counted as a single water droplet by the detection circuitry in order to prevent counting the same water droplet multiple times. The droplet detector may sense phantom water droplets from the accumulation of condensation, dew and water particles on the droplet detector that should not be included in the droplet count. Phantom water droplets are excluded from the droplet count by validating detections sensed by the droplet detector using a second droplet detector positioned beneath the previously described droplet detector. Upon detecting a water droplet at the upper droplet detector, the detection circuitry monitors the lower droplet detector during a detection time window. Droplet detections are validated if a correlation droplet detection is sensed on the lower droplet detector during the detection window; if a correlation droplet detection is not detected on the lower droplet detector, the droplet detection from the upper droplet detector is assumed to be a phantom and excluded from counting. The detection window time period may be, for example, half of the time period between drips during a steady drip rate flow from the metering funnel. Once detected by the detection circuitry, using either embodiment, the water droplet is registered by counting circuitry.

The present intelligent irrigation rain sensor detects water droplets from the metering funnel and registers that droplet count in a memory. The detection electrodes together with the detection control comprise a detection circuit, which is predicated on the type of measurements being made. Whenever the detection control senses any change in an electrical property being monitored by the detection electrodes, it passes that information to the counter circuitry which registers a droplet count in a memory. Once the droplet count exceeds a rain threshold amount, the intelligent irrigation rain sensor immediately sends a rain signal to the irrigation controller. The rain signal itself may be in the form of a change is a bias voltage, a pulse or a more sophisticated rain command embedded in a message. Additionally, a rain message may also contain droplet count data. In response to receiving the rain signal, the irrigation controller usually suspends any ongoing water to avoid irrigating in a rainstorm. Unlike prior art rain sensors, the present irrigation rain sensor assesses the severity of the rain storm. The sensor continually passes rain signals to the irrigation controller as the rain threshold amount is exceeded, indicating that the irrigation watering should remain postponed for a longer time period. The logic for determining rainfall amounts from droplet count data may be onboard the rain sensor or incorporated in the irrigation controller. Since the present rain sensor accurately measures the rainfall amount, that information can be used not only to suspend ongoing irrigation cycles, but to adjust evapotranspiration data and algorithms present in the irrigation controller.

The presently described intelligent irrigation rain sensor may be wired to the irrigation controller or may be wirelessly coupled to a receiver located at the irrigating controller. Wireless operation is preferable due to the difficulty in routing wires from a roof edge where rain sensors are typically located. The wireless embodiment further comprises a power supply and a wireless controller that receives information from the sensor control unit, formats the information into encrypted words that are readable by only a wireless receiver with decryption logic and decryption key for the specific wireless controller. Wireless operation may be unidirectional or bidirectional communications between the intelligent irrigation rain sensor and the irrigation controller. Bidirectional communication between the rain sensor and irrigation controller is possible if both have transmitter/receiver pairs and the accompanying encryption/decryption logic.

BRIEF DESCRIPTION OF THE SEVERAL VIEWS OF THE DRAWINGS

The novel features believed characteristic of the present invention are set forth in the appended claims. The invention itself, however, as well as a preferred mode of use, further objectives and advantages thereof, will be best understood by reference to the following detailed description of an illustrative embodiment when read in conjunction with the accompanying drawings wherein:

Other features of the present invention will be apparent from the accompanying drawings and from the following detailed description.

DETAILED DESCRIPTION OF THE INVENTION

Element Reference Number Designations

| | |
|---|---|
| 100: | Prior art rain sensor |
| 102: | Hygroscopic disks |
| 104: | Switch |
| 106: | Housing |
| 108: | Adjustment gap |
| 110: | Transmitter section |
| 112: | Transmitter control |
| 114: | Transmitter |
| 200: | Intelligent rain sensor |
| 201: | Rain sensor unit |
| 202: | Rain catcher reservoir |
| 204: | Funnel |
| 206: | Primary droplet detector |
| 208: | Secondary droplet detector |
| 211: | Funnel opening |
| 212: | Leaf screen |
| 214: | Hornet screen |
| 216: | Water droplets |
| 220: | Sensor control unit |
| 222: | Detection control |
| 224: | Counter logic |
| 226: | Memory |
| 228: | Threshold adjustment |
| 230: | Adjustment interface |
| 232: | Irrigation controller conductor |
| 234: | Power supply |

-continued

| | |
|---|---|
| 240: | Wireless control unit (sensor) |
| 242: | Encryption logic |
| 244: | Transmitter |
| 246: | Sensor antenna |
| 250: | Irrigation controller |
| 260: | Wireless control unit (irrigation) |
| 262: | Decryption logic |
| 264: | Irrigation controller receiver |
| 266: | Irrigation controller antenna |
| 302A: | Primary electrode |
| 302B: | Primary electrode |
| 303A: | Electrode gap |
| 303B: | Electrode gap |
| 304A: | Secondary electrode |
| 304B: | Secondary electrode |

Figure 1:
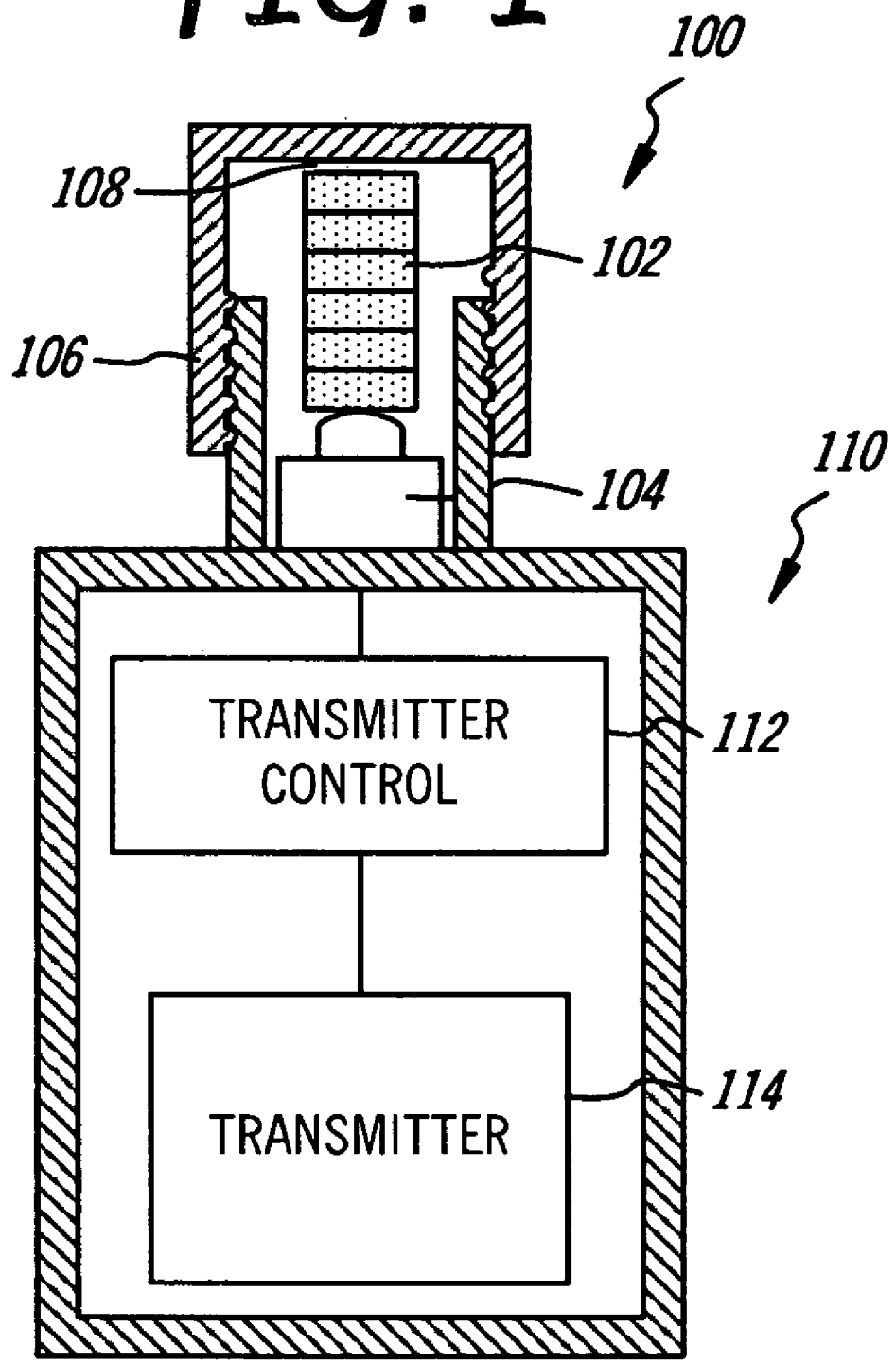
FIG. 1 shows a conventional rain sensor comprising a rain sensor component and a transmitter component as is known in the prior art.

FIG. 1 shows a conventional rain sensor comprising rain sensor component 100 and transmitter component 110 as is known in the prior art. Prior art rain sensor component 100 generally comprises one or more hygroscopic disks 102 contained in adjustable housing 106 that are juxtaposed to actuator switch 104. Actuator switch 104 is in turn connected to transmitter component 110, in this case as wireless transmitter. Switch 104 is electrically coupled to transmitter 114 through transmitter control 112.

In operation, rain and moisture are sensed by rain sensor component 100, which sends an electrical rain signal to transmitter component 110. Hygroscopic disks 102 swell in the presence of moisture and, ideally, their sizes increase proportionally with the amount of water they absorb. Typically, actuator 104 is either a normally-open state switch or normally-closed state switch that changes state upon an application of a force generated by hygroscopic disks 102. Adjustment gap 108 may be provided between hygroscopic disks 102 and housing 106, the size of which may be increased or decreased by manually adjusting the housing. As hygroscopic disks 102 swell, they apply force between the upper portion of adjustable housing 106 and actuator 104. At some point, that force triggers actuator 104 into a new state resulting in the generation of a "rain" signal to transmitter component 110. Conversely, as hygroscopic disks 102 dry out, they shrink, thereby relieving the force between adjustable housing 106 and actuator 104; actuator 104 returns to its original state resulting in the generation of a "dry" signal.

The purpose of rain sensor component 100 is to detect a significant rain event that would preclude the need for irrigation. Upon receiving a rain indication from transmitter 114, a conventional irrigation controller will typically cancel the next irrigation cycle or perhaps postpone irrigation until it receives a dry signal from rain sensor component 100. Therefore, rain sensor component 100 should not generate a rain signal from the mere presence of moisture, mist, fog or a trace of rain; these should not interfere with the scheduled irrigation cycle. On the other hand, rain sensor component 100 should not overlook any significant rain event over a predetermined threshold level of rain.

The hygroscopic material used in prior art rain sensors does not actually measure the amount of rainfall received at a site, but it merely expands proportionally to the amount of water it absorbs until it becomes saturated. Once the hygroscopic material is saturated it can no longer expand. Therefore, a prior art rain sensor can be tuned to detect a relative threshold level of rain by adjusting the size of adjustment gap 108. For instance, adjustment gap 108 may be adjusted wide enough such that no rain signal is generated from a mere trace of rain, but narrow enough that a rain signal is generated at the desired threshold level, for instance when an amount of rain is detected at ⅛ inch (0.125 inch), ¼ inch (0.25 inch), etc. (adjustable housing 106 may be graduated in rainfall measurement amounts to facilitate setting threshold adjustments). A typical prior art irrigation controller will not commence an irrigation cycle after receiving a rain signal until it receives the dry signal. More advanced irrigation controllers will not initiate an irrigation cycle within a preset time period of receiving a dry signal, for example, within twelve hours of receiving the signal.

While prior art rain sensors do not measure the amount of rainfall from a rain event, that data is often not needed since many prior art irrigation controllers merely suspend an irrigation cycle based on some amount of rainfall being detected (usually over a threshold amount that may be manually adjusted). However, more advanced irrigation controllers adjust the amount of irrigation water based on the water needs of the landscape by using, for example, an evapotranspiration rate for the landscape, such as discussed in U.S. Pat. No. 6,314,340 to Mecham, et al. entitled "Irrigation Controller," owned by the assignee of the present application which is incorporated by reference herein in its entirety. The Mecham patent calculates a reference evapotranspiration rate ($ET_0$) with a modified Hargreaves evapotranspiration algorithm using regional solar radiation data and temperature readings for the site. The evapotranspiration rate is corrected for the type of landscape (i.e., the crop type) and accumulated over a time period to find an ET deficit. The ET deficit is then used to find the amount of irrigation water needed by the landscape by offsetting the ET deficit by the amount of water received on the site during the time period, such as the rainfall amount. Hence, prior art rain sensors that utilize hygroscopic material are not optimal for use with ET irrigation controllers because they do not provide the accurate rainfall amounts needed for adjusting an evapotranspiration deficit calculated for the site.

The present invention relates to a novel intelligent irrigation rain sensor that is instantaneously responsive to rainfall and accurately measures the amount of rainfall, regardless of the amount of rainfall during a rain event. The accurate rainfall amounts from the present invention results in more accurate delay times for the watering cycles and is further useful for updating evapotranspiration data in an evapotranspiration-type (ET) irrigation controllers.

Figure 2:
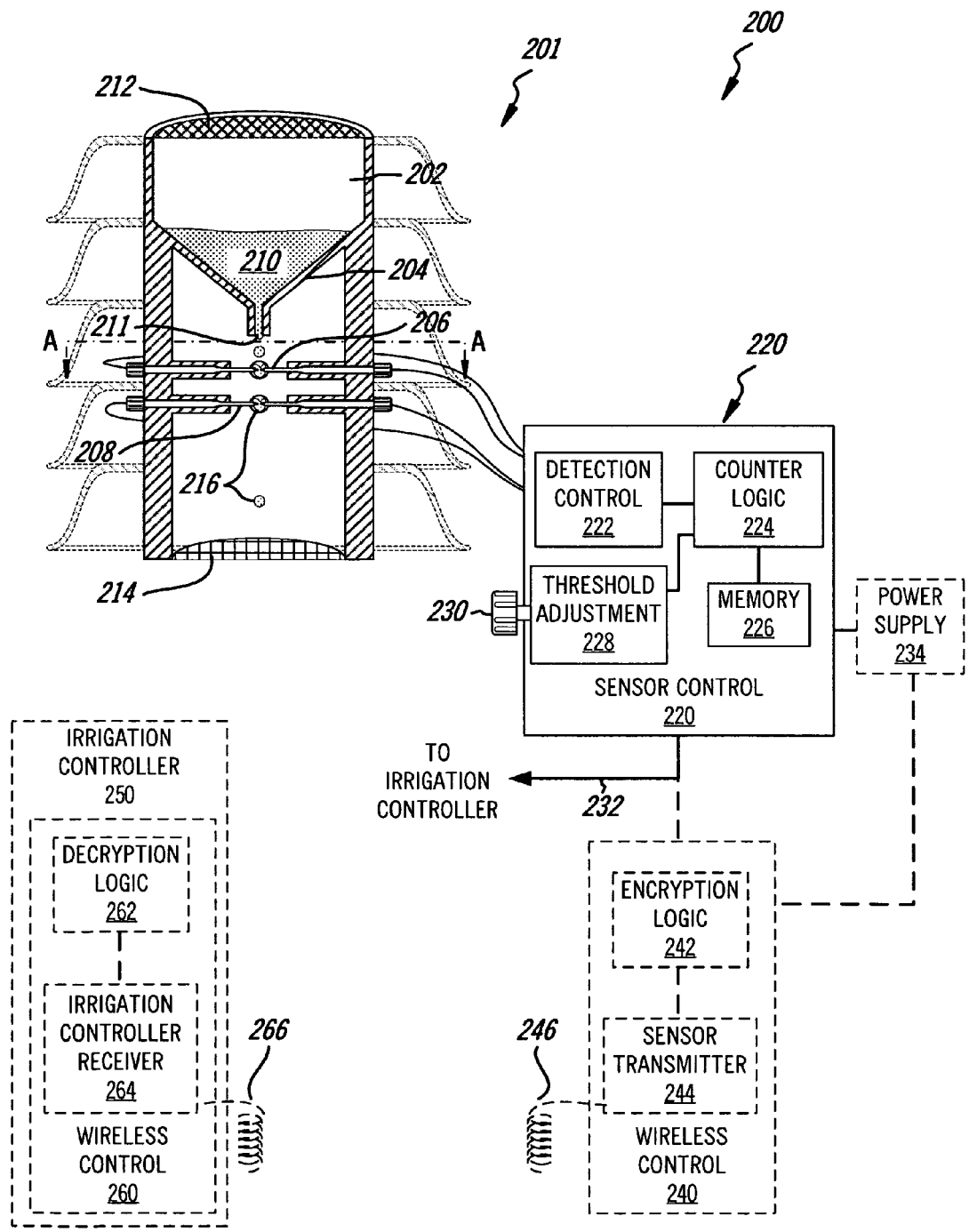
FIG. 2 is a diagram of a cross-sectional view of an intelligent irrigation rain sensor in accordance of one exemplary embodiment of the present invention.

FIG. 2 is a diagram of a cross-sectional view of an intelligent irrigation rain sensor (IIRS) in accordance of one exemplary embodiment of the present invention. The present IIRS 200 generally comprises a rain sensor unit 201 and sensor control unit 220. Rain sensor unit 201 has an essentially open top portion for catching rain water in rain catcher reservoir 202. The open top portion is protected by leaf screen 212 which allows water to pass but prevents leaves and other foreign matter from entering rain catcher reservoir 202. Rain catcher 202 has an internal volume for holding a volume of water (one or more linear incise depending on the circumference of rain catcher reservoir 202) that tapers into funnel 204. The lowermost extent of funnel 204 forms funnel opening 211 for metering water as it exits the lower extent of rain catcher reservoir 202. The aperture of funnel opening 211 is sized to allow rain water present in rain catcher 202 to egress as droplets 216 at a constant flow of droplets (referred to hereinafter as a steady-state drip rate), typically between ⅛ inch (0.125 inch) and ¼ inch (0.25 inch) in diameter. Each droplet 216 that exits funnel 204 forms an equally sized round drop having constant diameter (the optimal diameter of droplets 216 is approximately ¼ inch (0.25 inch).

Directly below funnel opening 211 is at least one droplet detector 206. As water droplets 216 exit funnel 204, they contact droplet detector 206, which detects each incident water droplet. After contact with droplet detector 206, water droplets 216 exit rain sensor unit 201 at its lower end which is further protected by hornet screen 214 (hornet screen 214 prevents hornets, bees, dirt (mud) daubers, ants and other pests from making a home in rain sensor unit 201).

Figure 3:
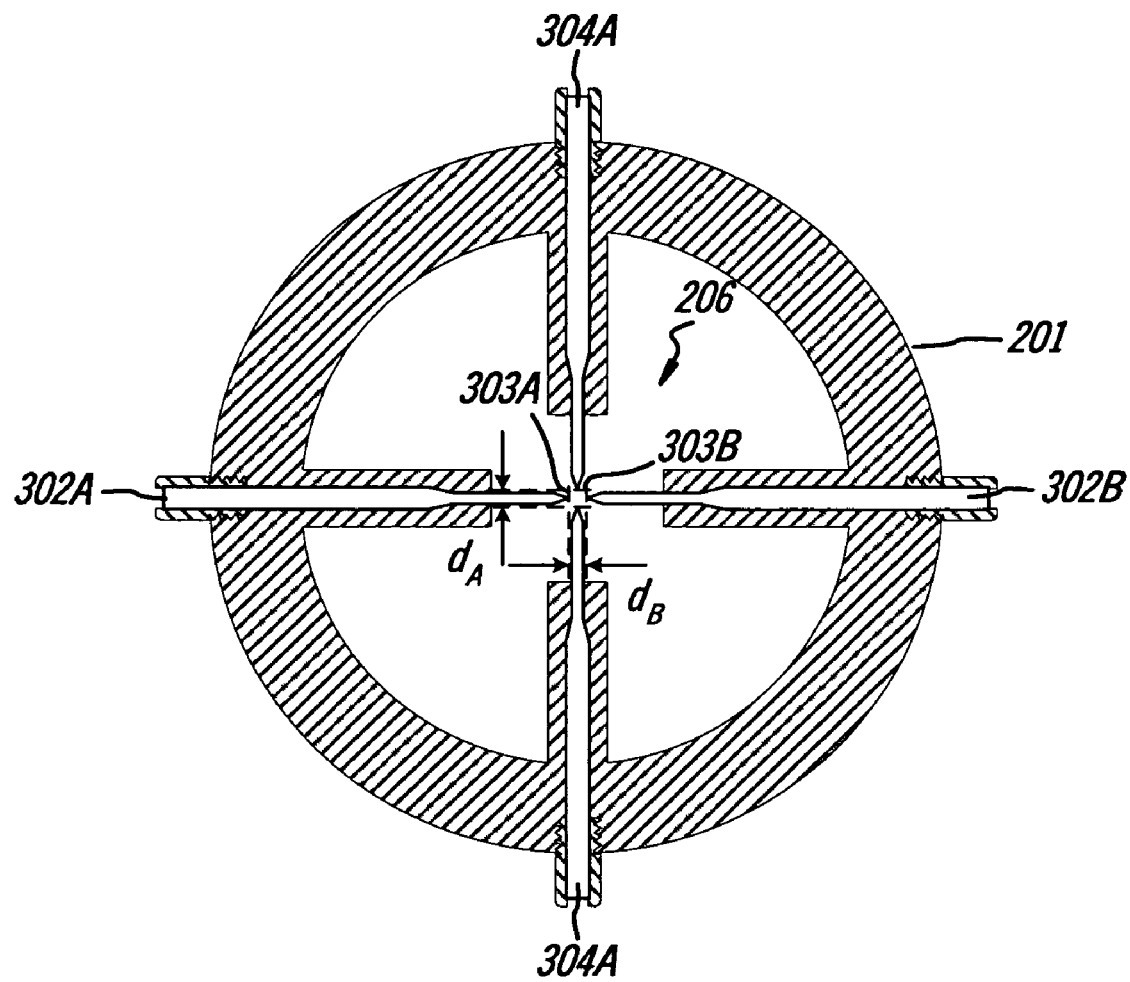
FIG. 3 is a diagram of a cross-sectional view of the detection electrodes of a an intelligent irrigation rain sensor in accordance of one exemplary embodiment of the present invention.

IIRS 200 detects the presence of individual droplets 216, rather than merely sensing moisture as do prior art rain sensors that utilize hygroscopic material. As water droplets 216 pass through funnel 204, they bridge the gap between at least one pair of detection electrodes in droplet detector 206. As further depicted in FIG. 3, electrode pair 304A may be oriented within the body of rain sensor 201 as opposing electrodes, separated by gap 303A, having a magnitude $d_A$. Alternatively, the tips of electrode pair 304A may form parallel traces that are separated by gap 303A, having a magnitude $d_A$, however, this design has the disadvantage of creating a slight capillary force that may temporarily hold the water droplet and which could mask detection of subsequent droplets received by the electrode pair. Alternatively, and as depicted in the figure, each electrode of electrode pair 304A is a contact probe having a generally pointed tip at gap 303A. The magnitude $d_A$ of gap 303A should be approximately half the diameter of water droplets 216 (or less), for instance a magnitude of approximately $d_A \approx \frac{1}{8}$ inch (0.125 inch). The magnitude $d_A$ of gap 303A should be sufficiently narrow such that each water droplet bridges gap 303A, but wide enough not to trigger false detections from fog, moisture or humidity.

Rain sensor unit 201 may be configured with multiple pairs of detection electrodes 304A, 304B and so on, with their gaps generally horizontally aligned with one another. Utilizing multiple sets of detection electrodes presents each water droplet 216 with a corresponding number of gaps, which tends to decrease the possibility that a water droplet will miss an electrode gap entirely (during high wind and such). The detection electrode pairs of the present invention are depicted as being substantially horizontal and coaxial, originating from opposite sides of the interior of body of rain sensor 201 (oriented at a 180 degree azimuth). However, it should be appreciated that detection electrode pairs 304A and 304B may not be horizontal but may instead slope downward (or upward) toward gaps 303A and 303B. Furthermore, detection electrode pairs 304A and 304B need not have an orientation azimuth of 180 degrees, as long as the magnitude for gaps 303A and 303B is maintained at approximately half the diameter of a water droplet. For instance, orientation azimuth may be 120 degrees between each of two or three pairs of detection electrodes.

In either case, detection electrode pairs 304A and 304B of droplet detector 206 are electrically coupled to detection control 222 of sensor control unit 220, as shown in FIG. 2. Detection control 222 may be embodied as electrical circuitry, logic and/or firmware. The purpose of detection control 222 is to continually monitor an electrical property of a detection circuit that includes gaps 303A and 303B between respective detection electrode pairs 304A and 304B and then to detect water droplets based on sensing a change in the electrical property being monitored. Detection control 222 may comprise, for example, an uncomplicated silicon controlled rectifier (SCR) voltage regulator circuit for each detection electrode pair which essentially uses no power until a water droplet comes in contact with its electrode pair. Alternatively, detection control circuit 222 may employ other detection circuitry such as a mechanical contact, optical, capacitive, or inductive detection, in such case droplet detector 206 may then be configured with an appropriate sensor (i.e., micro-switch, light detector/source, faraday plates or induction coils, respectively).

In accordance with still another exemplary embodiment of the present invention, rain sensor unit 201 may utilize multiple droplet detectors positioned at different vertical intervals within rain sensor unit 201 for validating a detection event of water droplet 216, thereby reducing the likelihood of passing a phantom droplet detection indication to the counter logic. In accordance with this embodiment, primary droplet detector 206 is adjacent to funnel opening 211 and secondary droplet detector 208 is directly beneath primary droplet detector 206. Detector control 222 has embedded intelligence for validating water droplet detection. In operation, detector control 222 receives a detection indication from one or more electrode pairs within primary droplet detector 206 as discussed above, however, rather than passing the detection information directly to counter logic 224, detection control 222 commences a detection time window for monitoring one or more detection electrode pairs within secondary droplet detector 208. Only if detector control 222 receives a corresponding detection indication signal from secondary droplet detector 208 within the detection time window will it pass a count signal to counter logic 224. Alternatively, the intelligence for validating water droplet detection resides within counter logic 224 rather than detector control 222; in that case detector control 222 passes every detection indication it receives from primary droplet detector 206 and secondary droplet detector 208 to counter logic 224 for validation. Here again, counter logic 224, similarly with most of the components of sensor control unit 220, may be embodied as electrical circuitry, logic and/or firmware.

In either case, counter logic 224 receives droplet detection indications from detection control 222 and counts each by, for example, incrementing a droplet count in memory 226 (alternatively, the droplet count may be converted internally to a rainfall amount using the internal volume of the rain catcher reservoir 202 and registering the rainfall amount in memory 226 as increments of an inch). The droplet count is retained in memory 226 until the occurrence of a transfer event, at which time an indication of the droplet count is sent to irrigation controller 250. This indication may be in the form of a rain signal, a droplet count (or rainfall measurement) or both. The transfer-event may be based on either droplet count overflow, time or a combination of the two. Hence, sensor control unit 220, either detector control 222 or counter logic 224, will act as a transfer-event manager for recognizing and acting on a transfer-event. For example, sensor control memory 226 may overflow at a RAIN threshold equal to X water droplet counts and then sends a RAIN signal to irrigation controller 250. The value for X of the RAIN threshold may be adjusted by the operator using manual adjustment interface 230 on the intelligent rain sensor. Typically, adjustment interface 230 is a knob, thumb wheel or adjustment lever with associated rainfall indicia in $\frac{1}{16}$ inch, $\frac{1}{10}$ inch (0.1 inch) or $\frac{1}{8}$ inch (0.125 inch) graduations (internally, the rainfall amount is correlated to a corresponding droplet count using the volume of the rain catcher/reservoir).

More particularly, sensor control unit 220 may be configured to send a RAIN signal only in response to sensing significant rainfall event consisting of measurable rainfall. Measurable rainfall is any rainfall that should be considered as part of a significant rainfall event. Water droplets formed from mist, fog, condensation or a mere trace of rain, although technically measurable using the present intelligent rain sensor, should not be included in a rainfall total for modifying an irrigation schedule, hence are not considered as measurable rainfall for the present invention. Instead, measurable rainfall is determined from the drip rate for the water exiting metering funnel 204. As mentioned above, rainwater exiting metering funnel 204 generally flows at a known steady-state drip rate. This is because during a significant rain event rainwater accumulates in rain catcher reservoir 202. Water droplets formed from mist, fog, condensation or a mere trace of rain being captured in rain catcher reservoir 202 usually cannot attain this steady-state drip rate and, as such, can be distinguished from measurable rainfall. Therefore, water droplets detected from metering funnel 204 must exceed some minimum drip rate to be registered in memory 226 (the minimum drip rate may be defined as half the steady-state drip rate of water exiting the metering funnel over a relatively short time period, perhaps ten or twenty seconds).

A significant rainfall event is rainfall that will affect the irrigation schedule or amount of water used for irrigation, hence the amount of rainfall and the rate of rainfall should be considered in determining whether or not a rainfall event is significant. For instance, $1/20$ inch (0.05 inch) of rainfall may be considered an insignificant trace of rain and should not affect the irrigation schedule. However, if that $1/20$ inch (0.05 inch) of rainfall is registered and resides in memory 226 indefinitely, several other insignificant rain events may be combined to trigger an invalid RAIN signal. Therefore, a significant rainfall event is defined hereinafter as the RAIN threshold amount detected over a measurement time period, for instance, twelve hours. Hence, memory 226 retains the droplet count for only the most recent measurement time period, unless the RAIN threshold is exceeded, in which case a RAIN signal is sent to irrigation controller 250 and the measurement time period is restarted. Consequently, sensor control unit 220 will issue a RAIN signal to irrigation controller 250 only after detecting a significant rainfall event, i.e., the amount and rate of rainfall exceeds some threshold levels.

When the droplet count in memory 226 exceeds the RAIN threshold amount X, sensor control unit 220 generates a RAIN signal that is indicative of the RAIN threshold amount X. For example, assuming catcher reservoir 202 holds approximately 8000 drops/inch, the RAIN threshold may be set manually to $1/8$ inch (0.125 inch) of rain using adjustment interface 230, which corresponds to 1000 drops of water. Then, for each increment of 1000 drops that is registered in memory 226, sensor control unit 220 generates a RAIN signal that is indicative of 1000 drops (or $1/8$ inch (0.125 inch) of rain), decrements memory 226 by an equivalent of 1000 droplet counts (usually by resetting memory 226 to 0) and then restarts the measurement time period. As may be appreciated, the RAIN signals generated by sensor control 220 of the present invention are predicated on direct rainfall amount measurements by rain sensor unit 201 and not on an indirect inference of rainfall from the expansion of a hygroscopic material in the presence of moisture as in prior art rain sensors.

The RAIN signal is sent either directly to irrigation 250 controller or to wireless control unit 240 depending on whether IIRS 200 is operating in wired or wireless mode. In the wireless mode, wireless control unit 240 of IIRS 200 communicates with wireless control 260 of irrigation controller 250. Typically, wireless control 240 comprises encryption logic 242 for encrypting increment amount signals in a messaging format that can be understood by decryption logic 262 of wireless control 260. Communication is typically unidirectional from IIRS 200 to irrigation controller 250, wherein irrigation controller 250 continually listens for communication messages from IIRS 200. For that case, wireless control 240 includes sensor transmitter 244 and a wireless media communication port, such as antenna 246 for communicating with irrigation controller 250 via wireless media. Similarly, wireless control 260 includes a corresponding irrigation controller receiver 264 and corresponding wireless media communication port, antenna 266, for receiving wireless media. In a more advanced system, irrigation controller receiver 264 and sensor transmitter 244 are replaced by transceivers for bi-direction communications (the separate encryption logic and decryption logic is also supplemented by encryption/decryption logic for encoded and decoding messages). Using a bidirectional transmission protocol, IIRS 200 repeatedly transmits a message to irrigation controller 250 until the irrigation responds with an acknowledgement message, thereby ensuring that irrigation controller 250 has received the message information. In wireless mode, IIRS 200 receives operational power from a local power supply 234 (typically a 9 volt DC battery that must be replaced regularly to ensure continued operation). Wireless transmissions place a high power demand on power supply 234 and, therefore, should be kept to a minimum, hence the transfer event should be based on exceeding a RAIN threshold amount. It should be mentioned, however, more advanced irrigation controllers may have the capability to receive and process, such as for evapotranspiration calculations.

In wired mode, IIRS 200 is directly coupled to irrigation controller 250 by conductor 232, through which sensor control unit 220 communicates with the irrigation controller and the irrigation controller provides continuous power for operating the rain sensor. A wired media communication port for connecting wire media conductor 232 to irrigation controller 250 may be disposed within sensor control unit 220 or sensor wireless control 240. Optionally, a wired control (not shown) may be disposed within or on irrigation controller 250 for receiving and deciphering signals from IIRS 200. One advantage of the wired operational mode is that the operation power for IIRS 200 is not limited to a battery power supply 234. Additionally or alternatively, because the wired mode does not suffer from limited local power supply battery, rain sensor unit 201 can transmit individual detection events or relatively low count amounts, thereby enabling the counting logic and the like to be offloaded from IIRS 200 to irrigation controller 250.

The presently described intelligent water sensor is adaptable for use with both non-evapotranspiration legacy irrigation controllers and evapotranspiration-type controllers. For non-evapotranspiration legacy irrigation controllers that cannot adjust their irrigation cycles for environmental influences, such as the evapotranspiration rate of the landscape, sensor control unit 220 operates in the prior art RAIN/DRY mode. In the RAIN/DRY mode, IIRS 200 sends a RAIN signal to the legacy irrigation controller after detecting a significant rainfall event. Then, following drying period, IIRS 200 sends a DRY signal to the irrigation controller. For evapotranspiration-type irrigation controllers, the IIRS 200 sends a RAIN signal to irrigation controller 250 that is indicative of a rainfall amount or droplet count. In accordance with one exemplary embodiment of the present invention, a signal from sensor control unit 220 may be as uncomplicated as binary pulses. For example, the RAIN signal may be a single, duplet or some other positive pulse signature and the DRY signal is an inverse negative pulse (this embodiment is represented diagrammatically on FIGS. 4A and 4B). Upon receiving a RAIN signal, a non-evapotranspiration legacy irrigation controller immediately ceases the irrigation schedule and listens for a DRY signal; once received the legacy irrigation controller resumes that irrigation schedule. An ET irrigation controller may also cease an active irrigation cycle upon receipt of a RAIN signal, however the ET irrigation controller understands the RAIN signal as a RAIN threshold amount of rainfall and modifies the ET deficit accordingly (this requires that the RAIN threshold X that is adjusted at sensor control unit 220, to be entered in irrigation controller 250. The DRY signal has no meaning for an ET irrigation controller and is disregarded.

Alternatively, communication between the IIRS 200 and the irrigation controller RAIN signal may be in the form of messages between sensor wireless control unit 240 and irrigation wireless control unit 260. For instance, a message may consist of a header and command item (i.e., in the form of <header><command><end> wherein the command item may be a RAIN or DRY command). In that case, a legacy irrigation controller would suspend the irrigation cycle and an ET irrigation controller would again understand the RAIN command as a RAIN threshold amount of rainfall. The messaging protocol may be more complicated wherein the message consists of a header, command item and a data item (i.e., in the form of <header><command><data><end> wherein the command item may be a RAIN or DRY command and the data item is the droplet count). In this case, the legacy controller disregards the droplet count as it cannot process the data and the ET irrigation controller would parse out the droplet data for determining the rainfall amount and modifying its irrigation cycle for environmental influences, such as the evapotranspiration rate.

One shortcoming of prior art hygroscopic rain sensors is that they cannot measure the amount of rainfall and, therefore, have particular difficulty accessing an appropriate duration prior to issuing a DRY signal (the DRY signal is typically issued once the hygroscopic material has shrunk sufficiently to release an activation switch). In contrast with the prior art, the present intelligent irrigation rain sensor sends a RAIN signal each instance the RAIN threshold amount has been exceeded in memory 226. Hence, irrigation controller 250 may receive several sequential RAIN signals without receiving a DRY signal. Having this intelligence in the rain sensor is particularly advantageous for legacy irrigation controllers that cannot adjust their irrigation cycles for environmental influences.

Figure 4A:
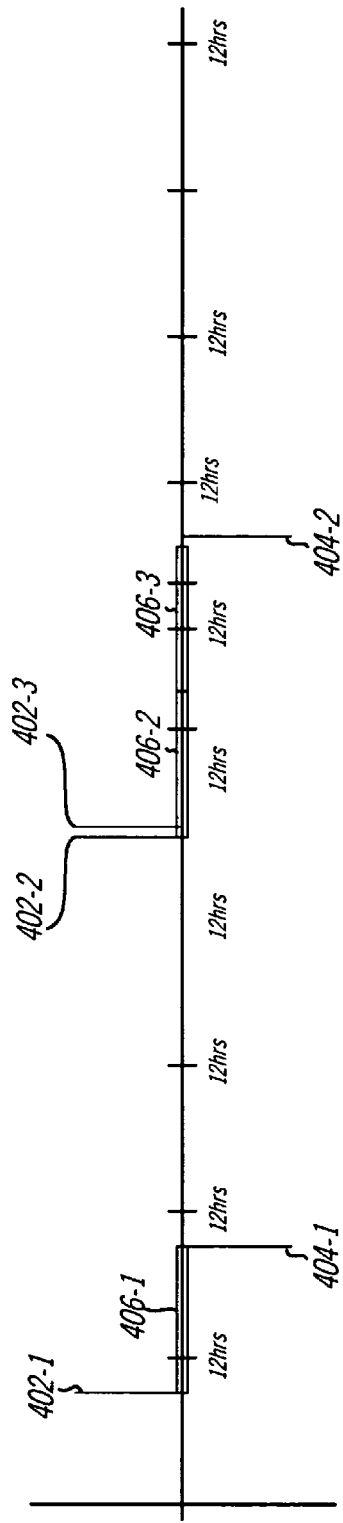
FIGS. 4A and 4B are timelines of communication from an intelligent irrigation rain sensor in accordance with an exemplary embodiment of the present invention.
Figure 4B:
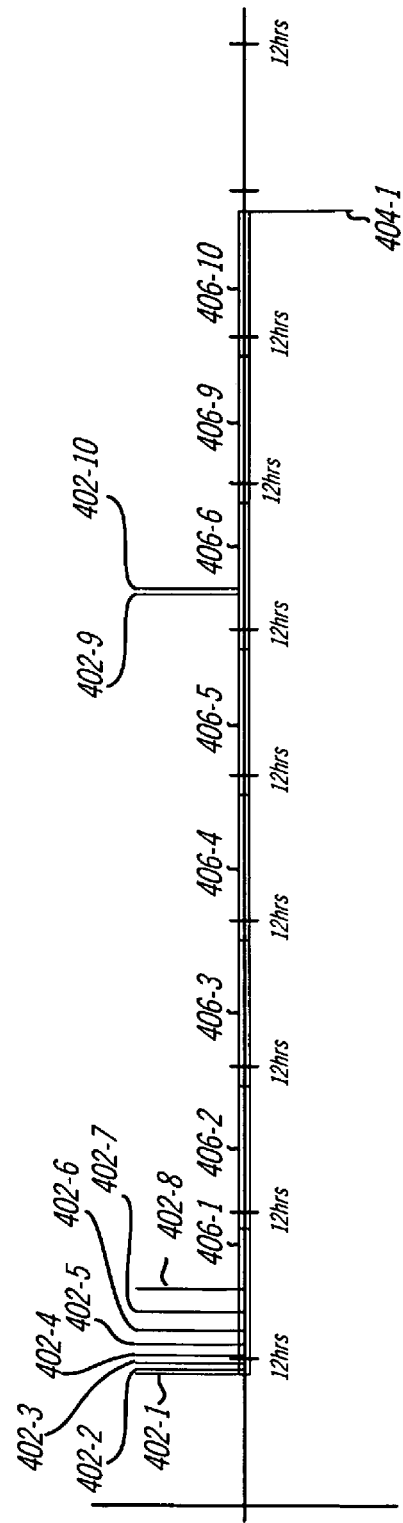

The rain delay features of the present invention can be more readily understood from a discussion of FIGS. 4A and 4B. FIGS. 4A and 4B are timelines of communication from IIRS 200 in accordance with an exemplary embodiment of the present invention. IIRS 200 is continually monitoring its droplet detectors for water droplets that may indicate a significant rainfall event from measurable rainfall. Once detected, a RAIN signal is generated and issued to irrigation controller 250. At the left portion of the diagram in FIG. 4, RAIN signal 402-1 is generated by the intelligent rain sensor. After which, DRY period 406-1 elapses before the IIRS 200 generates corresponding DRY signal 404-1. For the purpose describing the present invention, an exemplary DRY period is set to twelve hours and an exemplary RAIN threshold amount is set at ⅛ inch of rainfall. In accordance with another exemplary embodiment of the present invention, DRY periods are cumulative, within the limits discussed below. Near the center of the diagram on FIG. 4A, a second RAIN signal 402-2 is issued and a second DRY period 406-2 commences immediately. However, prior to DRY period 406-2 elapsing, a subsequent RAIN signal 402-3 is issued. Here, the issuance of DRY signal 404-2 is delayed by sensor control unit 220 for a subsequent DRY period 406-3, corresponding to the third RAIN signal 402-3, and then sent to irrigation controller 250, i.e., two DRY periods elapse before the DRY signal is generated.

In accordance with still another exemplary embodiment of the present invention, the present intelligent irrigation controller may limit the number of consecutive DRY periods in order to more accurately reflect soil absorption after torrential downpour conditions (in which some of the rain runs off the landscape and is not absorbed into the soil). For example, assuming again a RAIN threshold of X=⅛ inch (0.125 inch) and a DRY period of twelve hours, the intelligent irrigation rain sensor may limit the number of consecutive DRY periods to six DRY periods (six consecutive dry periods is an exemplary number that may be adjusted for the local landscape conditions (i.e., percolation and slope). In so doing, any rainfall over ¾ inches (0.75 inch) within the twelve hour dry period will not result in an additional delay in a subsequent irrigation cycle by a prior art irrigation controller. Turning now to FIG. 4B, an inch of rain is detected by the IIRS 200 within a single DRY period, resulting in eight RAIN signals being generated: RAIN signals 402-1, 402-2, 402-3, 402-4, 402-5, 402-6, 402-7, and 402-8. DRY period 406-1 commences immediately upon the issuance of RAIN signal 402-1. However, because only six consecutive DRY periods can accumulate at any one time, DRY periods corresponding to RAIN signals 402-7 and 402-8 are absent, hence, only DRY periods 406-2, 406-3, 406-4, 406-5 and 406-6 follow DRY period 406-1.

A DRY signal should be issued immediately after DRY period 406-6 elapses. Notice, however, during DRY period 406-6, another quarter of an inch of rain is detected by the IIRS 200 resulting in the issuance of two new RAIN signals; signals 402-9 and 402-10. This rainfall results in an additional twenty-four hour delay for drying before DRY signal 404-1 can be sent to the irrigation controller, represented by DRY periods 406-9 and 406-10. After which, DRY signal 404-1 is sent to the irrigation controller.

Figure 5:
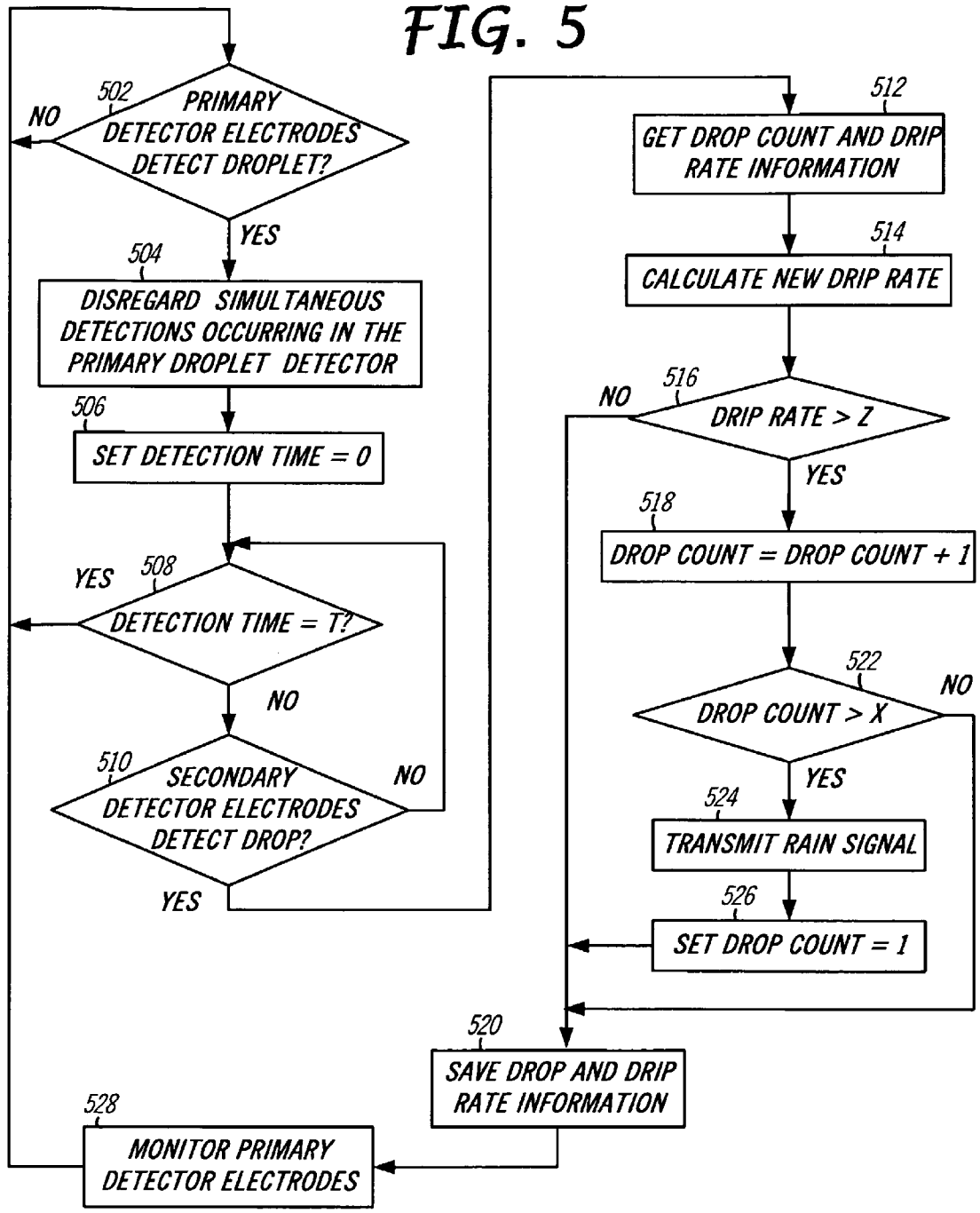
FIG. 5 is a flowchart depicting a water droplet detection method employed by the present intelligent irrigation controller in accordance with an exemplary embodiment of the present invention.

Below is a more thorough discussion of the novel detection and signaling methods employed of the present intelligent rain sensor. FIG. 5 is a flowchart depicting a water droplet detection method employed by the present intelligent irrigation controller in accordance with an exemplary embodiment of the present invention. The detection process is iterative, with the detection control 222 constantly monitoring primary droplet detector 206 for a change in the electrical properties at its detection electrodes (the change may also be optical or mechanical) (step 502). If a water droplet is detected, detections from other electrode pairs on the primary droplet detector are disregarded (step 504) and a detection timer commences a detection monitoring window for monitoring detection electrodes on the secondary droplet detector (step 506). During monitoring, the time is tested for closure of the monitoring window (step 508). The monitoring window closes at time T. If the monitoring window closes, i.e., Time=T, the detection from the primary detector is presumed to be a phantom and not counted. If a water droplet is detected on the secondary detection electrodes before Time=T (step 510) the drip rate information and droplet count are retrieved (step 512). The droplet count is registered in memory 226 as may be the drip rate information. However, the drip rate information is more transient in nature and is measured over a relatively short time period of ten or twenty seconds, therefore that information may be cached within detection control 222 of sensor control unit 220. A new drip rate is calculated using the time of latest droplet detection (step 514) and that drip rate is compared to the minimum drip rate, Z, that is necessary for registering the droplet in memory 226 as a droplet count (step 516). If the new drip rate is below minimum drip rate Z, the new drip rate information is stored, as is the droplet count (actually, it may be left unchanged in the memory) (step 520) and the process continues monitoring the primary droplet detector (step 528). If the new drip rate is not below minimum drip rate Z the droplet count is incremented by one (step 518) and the new droplet count is tested against the RAIN threshold (step 522). If the droplet count is less than the RAIN threshold, the new droplet count is saved to memory and drip rate information is cached (step 520) and the process continues monitoring the primary droplet detector (step 528). Conversely, if the droplet count is not less than the RAIN threshold, a RAIN signal is sent to the irrigation controller (step 524) and the droplet count is reset to one (step 526). Once again, the new droplet count is saved to memory, as is the new drip rate information (step 520) and the process continues monitoring the primary droplet detector (step 528).

Figure 6:
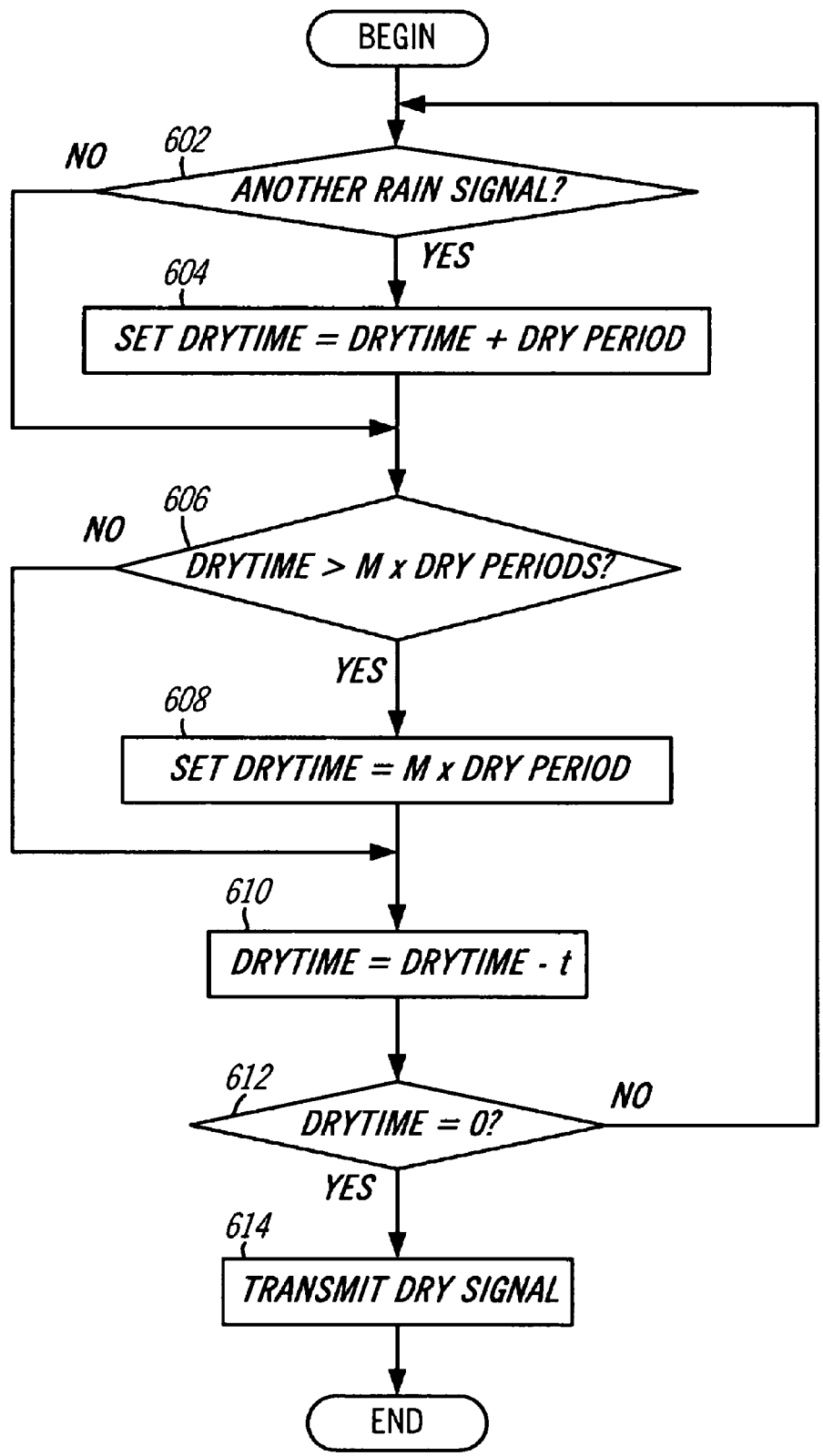
FIG. 6 is a flowchart depicting a novel method employed by the present intelligent irrigation controller for adjusting a DRY time and issuing a DRY signal in accordance with an exemplary embodiment of the present invention.

FIG. 6 is a flowchart depicting a novel method employed by the present intelligent irrigation controller for adjusting a DRY time and issuing a DRY signal in accordance with an exemplary embodiment of the present invention. The present process is an iterative process, which proceeds at regular intervals, say every t seconds (as a practical matter, the value of t should be less than the interval between drips at the steady-state drip rate for the metering funnel to ensure that each droplet is considered). The process commences a DRYTIME=0, i.e. after a DRY signal, with the issuance of a new RAIN signal. At the first iteration, a test is made for another RAIN signal (step 602). If one was issued since the last iteration, the DRYTIME is incremented by one DRY period (STEP 604), if no other RAIN signal has been issued, the incrementing step is omitted. Next, the DRYTIME is checked against the maximum number of consecutive DRY periods, M, for the landscape (step 606). Because the DRYTIME cannot exceed M DRY periods, if DRYTIME exceeds that amount, it is reset to M DRY periods (step 608), if not, the test step is omitted. The DRYTIME is then decremented by t (step 610) and DRYTIME is tested against 0 (step 612). If DRYTIME >0, the process iterates to the RAIN signal test (step 602) and continue iterating. If DRYTIME=0, the IIRS 200 sends a DRY signal to the irrigation controller (step 614) and the process ends.

The exemplary embodiments described below were selected and described in order to best explain the principles of the invention and the practical application, and to enable others of ordinary skill in the art to understand the invention for various embodiments with various modifications as are suited to the particular use contemplated. The particular embodiments described below are in no way intended to limit the scope of the present invention as it may be practiced in a variety of variations and environments without departing from the scope and intent of the invention. Thus, the present invention is not intended to be limited to the embodiment shown, but is to be accorded the widest scope consistent with the principles and features described herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. An intelligent irrigation rain sensor comprising:
   a rain sensor unit for capturing and interacting with rainwater, said rain sensor unit comprising:
      rain catcher reservoir having an open upper end for catching rain, an interior volume for holding rainwater and a metering orifice at a lower end of the interior volume for metering rainwater from the interior volume as individual water droplets;
      a droplet detector comprising a pair of detection electrodes and disposed below the metering orifice for interacting with the individual water droplets metered from the rain catcher reservoir;
      a rainfall threshold adjustment interface for adjusting the predetermined rain threshold count as an amount of rainfall; and
      a dry timer for comparing a time period subsequent to a communication of a rain signal to irrigation controller with a predetermined drying time period and for initiating the communication of a dry signal to the irrigation controller;
   a sensor control unit for monitoring the rain sensor unit and communicating with irrigation controller, said sensor control unit comprises:
      a detection control coupled to the droplet detector for sensing interactions between water droplets and the droplet detector, by sensing a change in an electrical property at the detection electrodes, and for generating a water droplet detection indication; and
      a transfer-event manager for recognizing a transfer event and for initiating the communication of the rain signal to the irrigation controller, wherein the transfer event is based on a comparison of a water droplet detection indication count from the counter and a predetermined rain threshold count; and
      a counter coupled to the detection control for receiving water droplet detection indications and counting the water droplet detection indications; and
   a media port for communicating a rain signal to irrigation controller.

2. The intelligent irrigation rain sensor in claim 1, wherein the transfer-event is time-based.

3. The intelligent irrigation rain sensor in claim 2, wherein the rain signal communicated to the irrigation controller includes a water droplet detection indication count.

4. The intelligent irrigation rain sensor in claim 1, wherein the droplet detector is an upper droplet detector, the intelligent irrigation rain sensor further comprises:
   a lower droplet detector below the upper droplet detector for interacting with the individual water droplets from the upper droplet detector.

5. The intelligent irrigation rain sensor in claim 4, wherein the detection control further comprises a phantom droplet discriminator for sensing corresponding interactions between water droplets and both the upper droplet detector and the lower droplet detector within a predetermined detection time period.

6. The intelligent irrigation rain sensor in claim 1, wherein the rain signal communicated to the irrigation controller includes a water droplet detection indication count.

7. The intelligent irrigation rain sensor in claim 1, wherein the dry timer accumulates a plurality of predetermined drying time periods for each of a plurality of rain signals, compares a time period subsequent to an issuance of a rain signal with the accumulated plurality of predetermined drying time periods and initiates a single dry signal for the plurality of rain signals.

8. The intelligent irrigation rain sensor in claim 1, wherein the detection control further comprises a drip rate comparator for comparing a drip rate of water droplets detected by the droplet detector to a minimum drip rate for generating the water droplet detection indication.

9. The intelligent irrigation rain sensor in claim 1, wherein the droplet detector further comprise one of a mechanical switch, light detector/source, faraday plates, electrodes and induction coil.

10. The intelligent irrigation rain sensor in claim 1, wherein the rain sensor unit further comprises:
a wireless transmitter.

11. The intelligent irrigation rain sensor in claim 1, wherein the interior volume of the rain catcher reservoir forms a funnel at the lower end with the metering orifice.

12. The intelligent irrigation rain sensor in claim 1, wherein the rain sensor unit further comprises a screen protector coupled to the open upper end.

13. The intelligent irrigation rain sensor in claim 1, further comprising:
a sensor communication controller for communication with the irrigation controller; and
an irrigation communication controller disposed on the irrigation controller for deciphering communications from the intelligent irrigation rain sensor.

14. An intelligent irrigation rain sensor comprising:
a rain sensor unit for capturing and interacting with rainwater, said rain sensor unit comprising:
rain catcher reservoir having an open upper end for catching rain, an interior volume for holding rainwater and a metering orifice at a lower end of the interior volume for metering rainwater from the interior volume as individual water droplets;
an upper droplet detector with an upper gap positioned directly beneath the metering orifice for interacting with the individual water droplets metered from the rain catcher reservoir; and
a lower droplet detector with a lower gap, said lower gap being positioned directly beneath the upper gap of the upper droplet detector and directly beneath the metering orifice for independently interacting with the individual water droplets from the upper droplet detector;
a sensor control unit for monitoring the rain sensor unit and communicating with an irrigation controller, said sensor control unit comprises:
a detection control coupled to the droplet detector for sensing interactions between water droplets and the droplet detector and for generating a water droplet detection indication; and
a counter coupled to the detection control for receiving water droplet detection indications and counting the water droplet detection indications; and
a media port for communicating a rain signal to irrigation controller.

15. The intelligent irrigation rain sensor in claim 14, wherein the detection control further comprises a phantom droplet discriminator for sensing corresponding interactions between water droplets at both the upper droplet detector and the lower droplet detector within a predetermined interaction time period.

* * * * *